March 3, 1931.  P. FRÉGEAU  1,795,206
CHAIN FASTENING DEVICE
Filed July 26, 1930
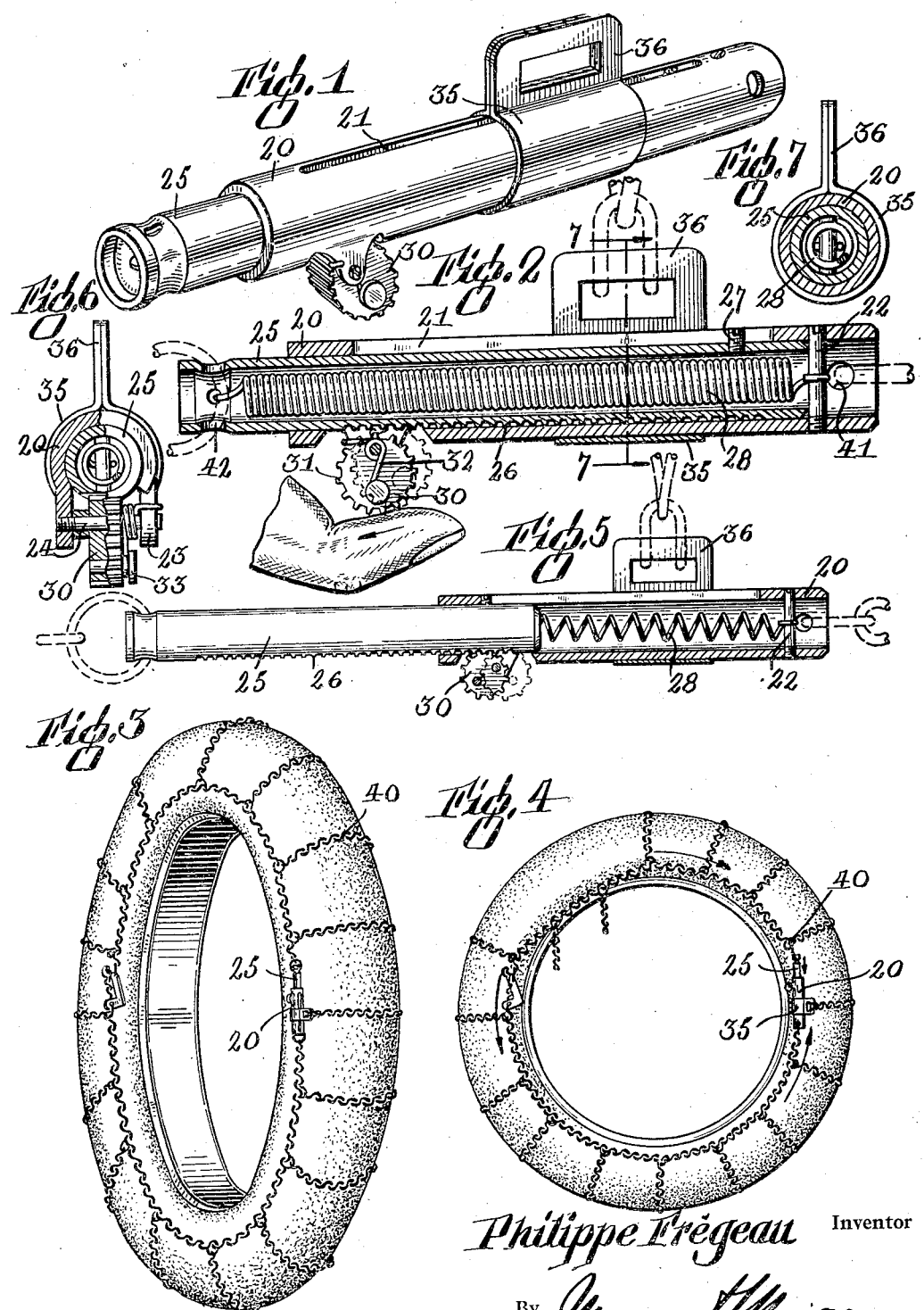
Philippe Frégeau Inventor
By *Marion* *Marion*
Attorneys Patented Mar. 3, 1931

1,795,206

UNITED STATES PATENT OFFICE

PHILIPPE FRÉGEAU, OF VERCHERES, QUEBEC, CANADA

CHAIN-FASTENING DEVICE

Application filed July 26, 1930. Serial No. 470,941.

The present invention relates to improvements in fastening devices and has particular reference to a device designed for fastening anti-skid chains for automobile wheels and the like.

An important object of the invention is the provision of a fastening device designed to draw together and tightly fasten the ends of the side chains of an automobile anti-skid chain.

A further object of the invention is the provision of a fastening device of the above character having means for resiliently contracting the ends of the chain and for securing the same in tightly drawn arrangement.

Another object of the invention is the provision of a tightening device of the above character which is comparatively simple and durable in construction and which will be efficient for the purpose intended.

Other objects and advantages of the invention will become apparent as the description progresses.

In the accompanying drawings forming a part of this specification and in which like reference characters are employed to designate corresponding parts throughout the same:

Figure 1 is a perspective view of the assembled device,

Figure 2 is a longitudinal central section through the same,

Figure 3 is a perspective view showing the fastening device applied on anti-skid chains, Figure 4 is a side elevational view showing the automatic tightening of the side chains upon the breakage of a pair of cross chains, Figure 5 is a side elevational view of the device in extended position, partly in cross section, Figure 6 is a front elevational view partly in section, and Figure 7 is a transverse sectional view taken on the line 7—7 of Figure 2.

Referring to the drawings, wherein for the purpose of illustration is shown a preferred embodiment of the invention, the numeral 20 generally designates the casing of the fastener which is in the form of a tube formed of metal or other suitable material open at the ends. At one side, the casing 20 is formed with a straight longitudinal slot 21 terminating adjacent the ends thereof.

At the rear end of the casing 20 is secured a transversely extending pin 22, the purpose of which will be later described. On the side opposed to the slot 21, and adjacent the forward end of the casing is formed a rectangular shaped aperture having formed at transversely opposed sides a pair of outwardly projecting ears 23 apertured to engage a bearing pin 24 adjacent their outer ends.

Mounted for longitudinal adjustment within the casing 20 is a slide member 25 also preferably of tubular construction arranged concentrically within the casing and telescopically slidable therein. The slide member 25 is preferably open at the ends and is formed, at one exterior side, with a longitudinally extending toothed rack 26 arranged to coincide with the rectangular aperture in the casing. Attached to the opposed side of the slide member 25 is a screw 27 extending radially outward to slidably engage the longitudinal slot 21 of the casing, to limit the longitudinal sliding movement of the slide member.

Disposed within the tubular slide member 25 and having one end attached to the pin 22 and the opposed end hooked through an aperture adjacent the outer forward end of the slide member is a coiled compression spring 28 designed to normally urge the slide member to a retracted position within the casing.

An adjustable catch is disposed to engage the rack portion of the slide member to lock the same in extended or in a retracted position. In the present instance, this catch member is in the form of an annular pinion gear 30 having peripheral gear teeth 31 disposed to mesh with the teeth of the rack 26. The pinion 30 is formed with a transverse bore arranged eccentrically therethrough, through which is extended the bearing pin 24, the pinion being disposed between the ears 23 with the major portion projecting outwardly and adjustable longitudinally to engage the rack teeth at either side of the bearing. The pinion 30 is normally urged to a rearwardly directed rack engaging position by means of a frame 32, the intermediate portion of which is coiled about the bearing pin 24, having one end bent about the edge of one ear 23 while the opposed end is attached to a projection 33 extending from one side of the pinion at a position diametrically opposed to the projection of the bearing pin 24.

Securely fastened about the intermediate portion of the casing 20 is a metallic sleeve 35, the ends being disposed in contacting radially extending arrangement to form a loop 36 engageable with the exterior link of a cross chain.

In use, one end of the side chain of an anti-skid chain, generally indicated at 40, is attached to the rear end of the casing 20 in connection with apertures 41 formed therein. The opposed end of the side chain is connected with the outer forward extremity of the slide member 25, the end link of the side chain being extended through transverse apertures 42 therein. One of the cross chains is connected with the sleeve loop 36 to retain the device in proper position on the wheel.

Prior to the connection of the side chain to the outer forward end of the slide member, the slide is extended by adjusting the pinion catch 30 to an intermediate position and drawing the slide member outwardly against the tension of the spring 28. The catch is then swung forwardly so that the pinion teeth will engage the rack to lock the slide member in extended arrangement, the tension of the spring causing the pinion to retain a locking position.

When the side chain is connected to the outer end of the slide member, the catch member is adjusted to an intermediate position and the spring 28 will retract the slide member so as to tightly draw the side chain upon the tire, the catch being released so that it will automatically assume a rearwardly adjusted position in engagement with the rack to lock the slide member against extended movement.

Any slack developing in the side chains, as for instance due to the breakage of one or more cross chains as shown in Figure 4, will be automatically taken up by the fastening device or rather by the tension of the spring 28 which will draw the slide member 25 further inward. The slide will be automatically locked in such retracted position by the catch member which is urged against the rack for this purpose by the spring 32.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. A device of the character described comprising a tubular casing provided with an aperture adjacent one end, a tubular slide member mounted for sliding movement with respect to the casing, means for limiting the sliding movement of said slide member, a toothed rack formed on said slide member, a spring having one end attached to the casing and the opposed end attached to the slide member adapted to normally urge the slide to a retracted position in the casing, and a catch adjustably connected with the casing operable to engage the slide rack to lock the slide member in an extended or a retracted position.

2. A device of the character described comprising a tubular casing provided with an aperture adjacent one end, a tubular slide member mounted for sliding movement with respect to the casing, means for limiting the sliding movement of said slide member, a toothed rack formed on said slide member, a spring having one end attached to the casing and the opposed end attached to the slide member adapted to normally urge the slide to a retracted position in the casing, a catch adjustably connected with the casing engageable with the rack of the slide member to lock the same in an extended or a retracted position, and spring means normally urging the said catch into engagement with the rack to automatically lock the slide member against extended movement.

3. A device of the character described comprising a tubular casing formed with a longitudinal slot in one side and an aperture in the opposed side adjacent the forward end, a tubular slide member slidably mounted in the casing operable to an extended or a retracted position with respect to the casing, a toothed rack formed on one side of the slide member, a pin extending from the opposed side of the slide member engageable with the slot in the casing to limit the sliding movement of the said slide member, a spring having one end attached to the rear end of the casing and the opposed end connected with the forward end of the slide member tending to normally urge the slide member to a retracted position in the casing, a toothed catch adjustably connected with the casing and engageable with the rack of the slide member to lock the same in an extended or in a retracted position, and a spring connected with the catch member adapted to normally urge the same to a rearwardly tilted rack engaging position to automatically lock the slide member against extended sliding movement.

In witness whereof I have hereunto set my hand.

PHILIPPE FRÉGEAU.